United States Patent
Ishida et al.

[11] Patent Number: 6,064,876
[45] Date of Patent: May 16, 2000

[54] MOBILE COMMUNICATIONS SYSTEM AND METHOD WITH MESSAGE STORING FUNCTION

[75] Inventors: So Ishida, Tama; Hiroshi Tsukahara, Tokorozawa, both of Japan

[73] Assignee: NTT Mobile Communications Network, Inc., Tokyo, Japan

[21] Appl. No.: 08/666,310

[22] PCT Filed: Nov. 1, 1995

[86] PCT No.: PCT/JP95/02234

§ 371 Date: Jul. 3, 1996

§ 102(e) Date: Jul. 3, 1996

[87] PCT Pub. No.: WO96/14718

PCT Pub. Date: May 17, 1996

[30] Foreign Application Priority Data

Nov. 4, 1994 [JP] Japan .................................. 6-271585

[51] Int. Cl.⁷ .................................................. H04M 11/10
[52] U.S. Cl. ......................... 455/412; 370/445; 370/448; 379/88.23
[58] Field of Search ........................ 455/412, 413, 455/403, 445, 461, 510, 421, 458, 459; 379/89, 88.23, 211; 370/329, 330, 341, 445, 448

[56] References Cited

U.S. PATENT DOCUMENTS

| | | | |
|---|---|---|---|
| 4,964,156 | 10/1990 | Blair | 455/413 |
| 5,109,400 | 4/1992 | Patsiokas et al. | 455/412 |
| 5,164,942 | 11/1992 | Kamerman et al. | 370/448 |
| 5,327,481 | 7/1994 | Horimoto | 455/412 |
| 5,627,878 | 5/1997 | Strauch | 455/413 |

FOREIGN PATENT DOCUMENTS

| | | |
|---|---|---|
| A-58-53526 | 11/1983 | Japan . |
| 4-45621 | 2/1992 | Japan . |
| A-5-66783 | 9/1993 | Japan . |
| 5-292205 | 11/1993 | Japan . |
| 5-300245 | 11/1993 | Japan . |
| 6-284179 | 10/1994 | Japan . |

*Primary Examiner*—Wellington Chin
*Assistant Examiner*—Lee Nguyen
*Attorney, Agent, or Firm*—Brown Raysman Millstein Felder & Steiner

[57] ABSTRACT

A mobile communications system including a voice message function in both a communications network (10) and a mobile station (20). If the mobile station (20) does not respond, the communications network responds instead thereof, stores a message, and notifies the mobile station of the presence of the message. The mobile station requests the transfer of the message when accessible. The message can be positively sent to a mobile station even if it is not accessible for a long time.

9 Claims, 10 Drawing Sheets

(A)

(B)  × 7 TIMES

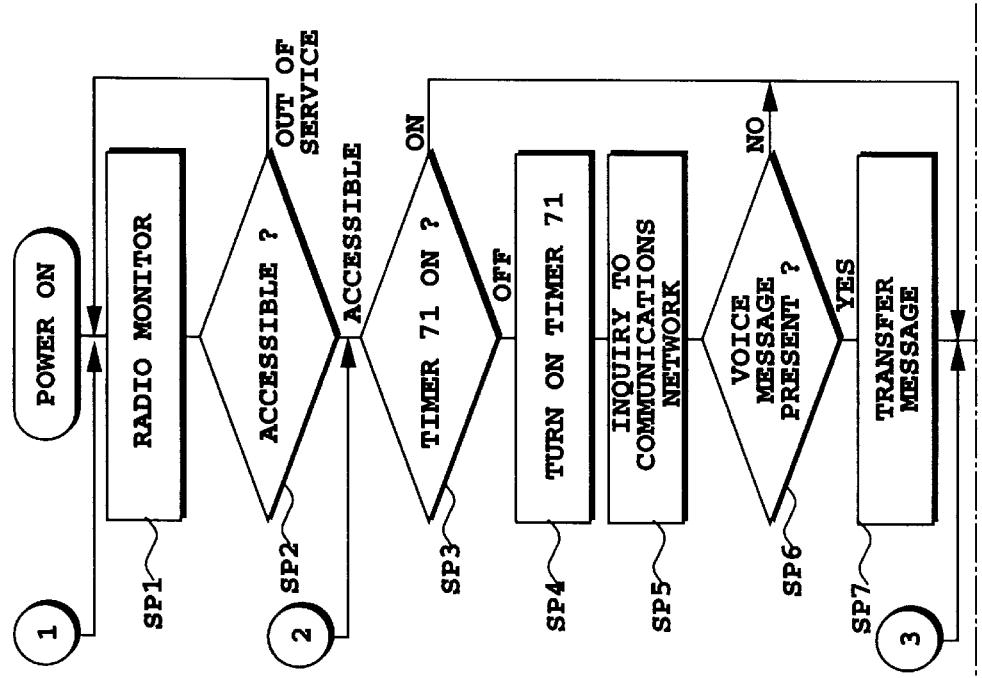

MOBILE COMMUNICATIONS SYSTEM AND METHOD WITH MESSAGE STORING FUNCTION

TECHNICAL FIELD

The present invention relates to a mobile communications system, and more particularly to a mobile communications system and method with message storing function provided at both communications networks and terminals.

BACKGROUND ART

Increasing variety of services have been provided with the development of communications. A communications system including a voice message center in a communications network is proposed as one of these services.

For example, Japanese patent application laying-open No. 5-292205 (1993), a first prior art, discloses a service which comprises a voice message storing function in a communications network, and transmits stored messages to subscribers. According to this service, it is not necessary for individual subscribers to posses answering machines.

Japanese patent application publication No. 5-66783 (1993), a second prior art, discloses a technique in which messages stored in the center for subscribers are transferred to their cards inserted in receiving terminals. Specifically, when a subscriber inserts a card storing his telephone number in a receiving terminal, the center transfers the message for him to this card. The card stores the message to be converted into a vocal message. It also discloses a technique which carries out paging when an urgent call connection occurs so that the addressee responding to it inserts his card in a receiver to receive the message. Furthermore, it discloses a technique which makes it possible for a subscriber to carry out a conversation with other subscribers through a switching center using wireless equipment incorporated in his card.

In addition, a technique is known which can be utilized when no voice message center is provided in a mobile communications system, but its subscriber has an answering machine connected to a public telephone network. In this case, the mobile communications system sends his message to the answering machine to be stored, and contacts his mobile station when it comes into a service area.

For example, Japanese patent application publication No. 58-53526 (1983), a third prior art, discloses a special service provided when a subscriber has both an answering machine connected to a public network and a mobile station connected to a mobile communications network. When the mobile station does not respond, the mobile switching center transfers a message to his answering machine, and then carries out automatic paging to the mobile station to notice the presence of the message when it comes into a service area, or transfers the message stored in the answering machine to the mobile station.

In addition, a system including an answering machine only in a mobile station is known as a fourth prior art.

These prior arts, however, present the following problems:

(1) In the first prior art, the terminal must be connected to the network (the switching center) each time the user wishes to listen to his message. This presents the following problems: the reproduction of the message is impossible when the line is unavailable; it takes a long time from a request to the reproduction of the message; traffic to the switching center will increase when users reproduce the message multiple times, etc. In addition, since the switching center handles messages from many subscribers, the stored messages must be deleted at fixed intervals. As a result, the message cannot be reproduced after the fixed interval has elapsed from the storing of the message.

(2) The second prior art discloses nothing about measures to be taken when the card cannot be connected to the center. As a result, the subscriber out of service area cannot be informed that a message is present even if an urgent one arrives. Furthermore, there is another problem that the message might be deleted if the subscriber forgets to take action for receiving it when he enters the service area. Another problem is that the message stored at the center cannot be obtained without a series of manual operations such as inserting his card in a receiver.

(3) In the third prior art, the subscriber must have the answering machine connected to the public telephone network besides the mobile station. Furthermore, since the message stored in the answering machine is transferred to the user through the mobile switching center each time requested, there are problems similar to those of item (1). Moreover, since the switching center carries out paging to the mobile station on one hand, and commands the answering machine to reproduce the message on the other hand, a complex program is required.

(4) In the fourth prior art, the mobile station cannot store incoming messages when its power is off, when the line between the mobile station and the network is unavailable, or when the mobile station enters places which the radio wave does not reach such as subways or the shadow of buildings.

DISCLOSURE OF THE INVENTION

In view of these backgrounds, an object of the present invention is to provide a mobile communications system and method which can reproduce a message promptly and freely at a mobile station once it has been connected with the communications network at a convenient time.

Another object of the present invention is to provide a mobile communications system and method which can transmit messages to mobile stations in a short time, and permit users to reproduce the messages in their favorite operation methods.

In a first aspect of the present invention, there is provided a mobile communications system which transfers a message sent from a first mobile station to a second mobile station via a communications network, wherein the mobile communications network comprising:
  receiving means for receiving a message from the first mobile station;
  storing means for storing the message received; and
  transfer means for transferring the message stored in the storing means to the second mobile station in response to an inquiry from the second mobile station, and the second mobile station comprising:
  means for inquiring of the communications network whether a message is stored or not; and
  memory means for storing the message sent from the communications network.

Here, the communications network may further comprise compression means for compressing the message and for recording a compressed message in the storing means, and the second mobile station may comprise decompression means for decompressing a compressed message.

The message may be voice information.

The inquiring means may comprise radio monitoring means for detecting whether the second mobile station enters a service area or not, and may automatically send to the communications network an inquiry about the presence of a message addressed to the second mobile station when it enters the service area.

The inquiring means may comprise timer means for preventing the inquiry from being sent for a predetermined time interval from a preceding inquiry.

The inquiring means may comprise timer means for allowing the inquiry to be sent after a predetermined time has elapsed after a call connection is provided from the communications network to the second mobile station and its user does not respond to the call connection.

In a second aspect of the present invention, there is provided a communications network which transfers a message transmitted from a first mobile station to a second mobile station, the communications network comprising:

responding means for responding to the first mobile station when the second mobile station does not responds;

receiving means for receiving a message from the first mobile station;

first storing means for storing the message received;

compression means for compressing the message stored in the first storing means;

second storing means for storing a compressed message; and transfer means for reading out the compressed message stored in the second storing means, and for transferring it to the second mobile station in response to an inquiry from the second mobile station.

In a third aspect of the present invention, there is provided a mobile station connected to a communications network which stores a received message after compression, the mobile station comprising:

means for deciding whether the mobile station is connectable to the communications network;

inquiring means for inquiring, when connectable, of the communications network about the presence of a compressed message which has been stored;

receiving means for receiving the compressed message transmitted from the communications network;

memory means for storing the compressed message received by the receiving means;

decompression means for decompressing the compressed message stored in the memory means; and means for reproducing a decompressed message.

In a fourth aspect of the present invention, there is provided a mobile communications method which transfers a message sent from a first mobile station to a second mobile station via a communications network, wherein processing in the mobile communications network comprises the steps of:

receiving a message from the first mobile station;

storing the message received; and transferring the message stored to the second mobile station in response to an inquiry from the second mobile station, and processing in the second mobile station comprises the steps of:

inquiring of the communications network whether a message is stored or not; and storing the message sent from the communications network.

Here, the processing in the communications network may further comprise the step of compressing the message followed by storing, and the processing in the second mobile station may further comprise the step of decompressing a compressed message.

The message may be voice information.

Here, the step of inquiring may comprise the steps of detecting whether the second mobile station enters a service area or not, and automatically sending to the communications network an inquiry about the presence of a message addressed to the second mobile station when it enters the service area.

The step of inquiring may comprise the step of preventing the inquiry from being sent for a predetermined time interval from a preceding inquiry.

The step of inquiring may comprise the step of sending the inquiry after a predetermined time has elapsed after a call connection is provided from the communications network to the second mobile station and its user does not respond to the call connection.

According to the present invention, if the second mobile station does not respond, the communications network responds instead, and stores the message from the first mobile station. After that, the second mobile station automatically asks the communications network whether a message is present or not, requests the communications network to transfer the message if it is present, and stores the message. This makes it possible for the user to reproduce the message repeatedly in an operation method of his choice.

Furthermore, when the message is compressed before stored at the communications network, and the compressed message is transmitted to the second mobile station to be received, stored and decompressed, a time of using the line is shortened, and the capacity of the storing means and the memory means can be reduced. Alternatively, the recording time of the message can be lengthened at the same memory capacity.

Once the message has been stored in the memory means of the mobile station, it can be reproduced freely even when the mobile station cannot be connected to the communications network, or after the message has been deleted from the storing means of the communications network.

BRIEF DESCRIPTION OF THE DRAWINGS

FIGS. 9A and 9B are flowcharts showing the operation of the mobile station of the embodiment.

BEST MODE FOR CARRYING OUT THE INVENTION

The invention will now be described with reference to the accompanying drawings.

Figure 1:
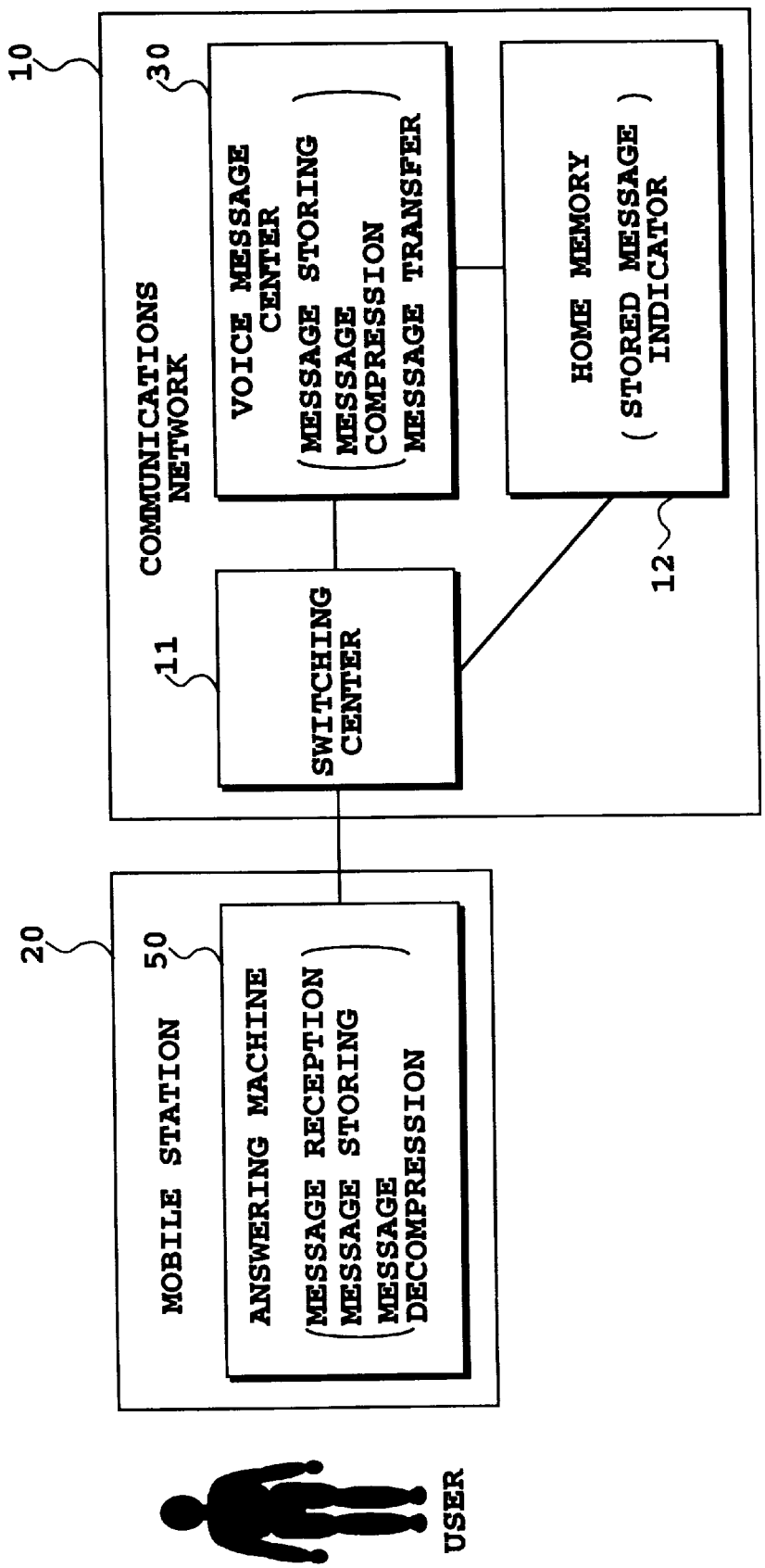
FIG. 1 is a block diagram showing an embodiment of a mobile communications network with a message storing function in accordance with the present invention.

FIG. 1 is a schematic diagram showing the arrangement of a major portion of a mobile communications system in accordance with the present invention.

In this figure, the reference numeral 10 designates a communications network. A plurality of mobile stations 20 are connected to the communications network 10 (only a single station is shown in FIG. 1). The communications network comprises a switching center 11, a home memory 12 and a voice message center 30. The home memory 12 stores subscriber's information such as the position of a subscriber, types of services, or the like. In addition, it has a stored message indicator representing whether a message addressed to a subscriber has been stored in the voice message center 30. The voice message center 30 includes message storing, message compression and message transfer functions.

On the other hand, the mobile station 20 includes an answering machine 50. The answering machine 50 has message receiving, message storing and message decompression functions.

Figure 2:
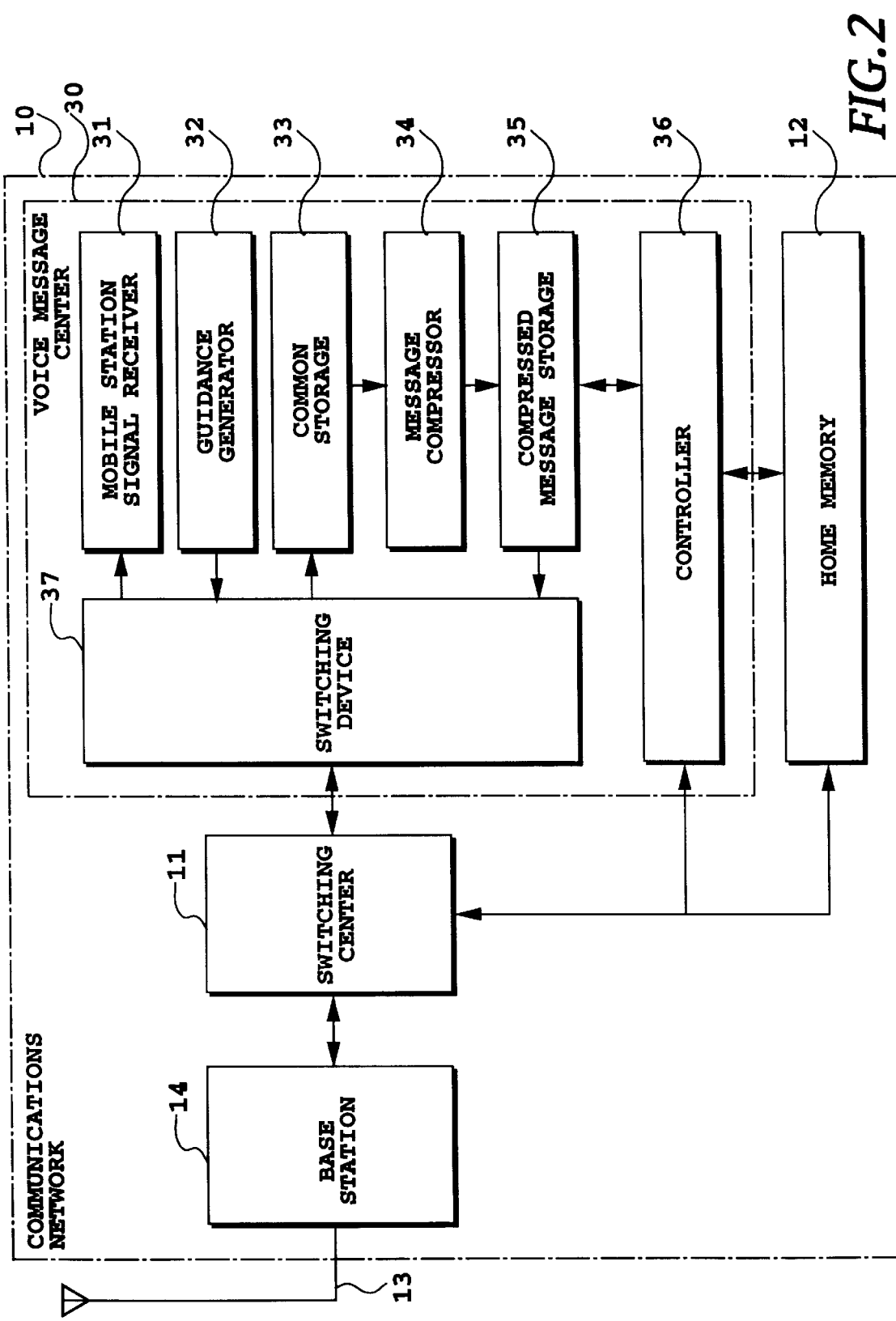
FIG. 2 is a block diagram showing an arrangement of a communications network of the embodiment.

FIG. 2 is a block diagram showing an arrangement of the communications network 10. A signal received by an antenna 13 is fed to a base station 14, and then to the switching center 11. Reversely, a transmission signal output from the switching center 11 is fed to the base station 14, and is transmitted to the mobile stations 20 via the antenna 13. The voice message center 30 connected to the switching center 11 comprises a receiver 31 of a mobile station signal, a guidance generator 32, a common storage 33, a message compressor 34, a compressed message storage 35, a controller 36 and a switching device 37.

The mobile station signal receiver 31 receives commands from the mobile station 20. The guidance generator 32 transmits various guidance messages to the mobile stations 20. For example, it transmits guidance to a source mobile station in order to prompt it to send a message to the voice message center 30. The common message storage 33 temporarily stores a message transmitted from a source mobile station. In this case, additional information is also stored such as the date and time of the call, and the telephone number of the source mobile station, or the like.

The message compressor 34 compresses the message stored in the common storage 33, and stores it in the compressed message storage 35. The compressed message storage 35 comprises hard disks for storing the compressed messages with the corresponding subscriber's telephone numbers. The controller 36 is connected to the switching center 11 and the home memory 12, and controls the various portions of the voice message center 30. The switch device 37 carries out line switching in voice message center 30.

Figure 3:
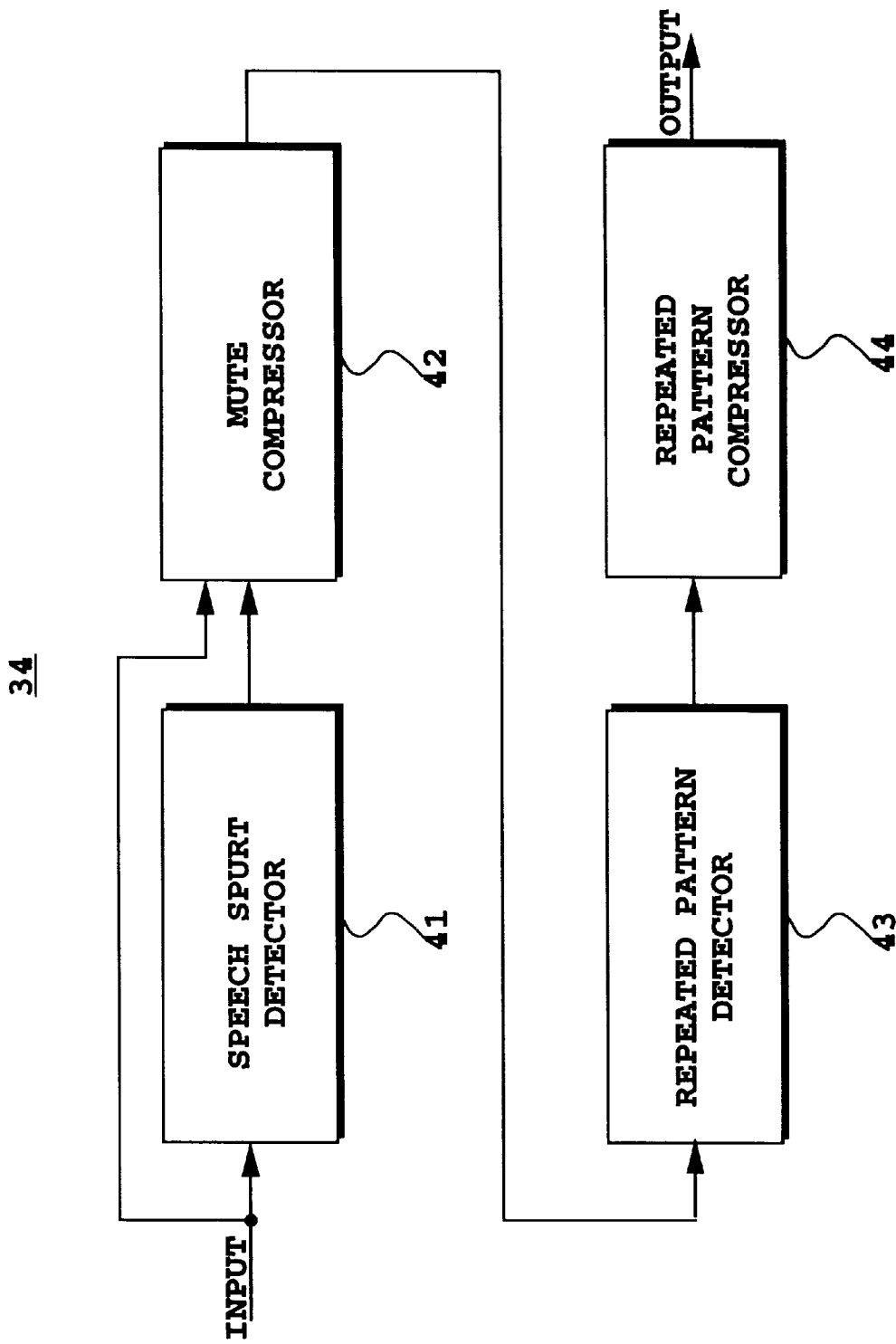
FIG. 3 is a block diagram showing an arrangement of a message compressor provided in the communication network.
Figure 4:
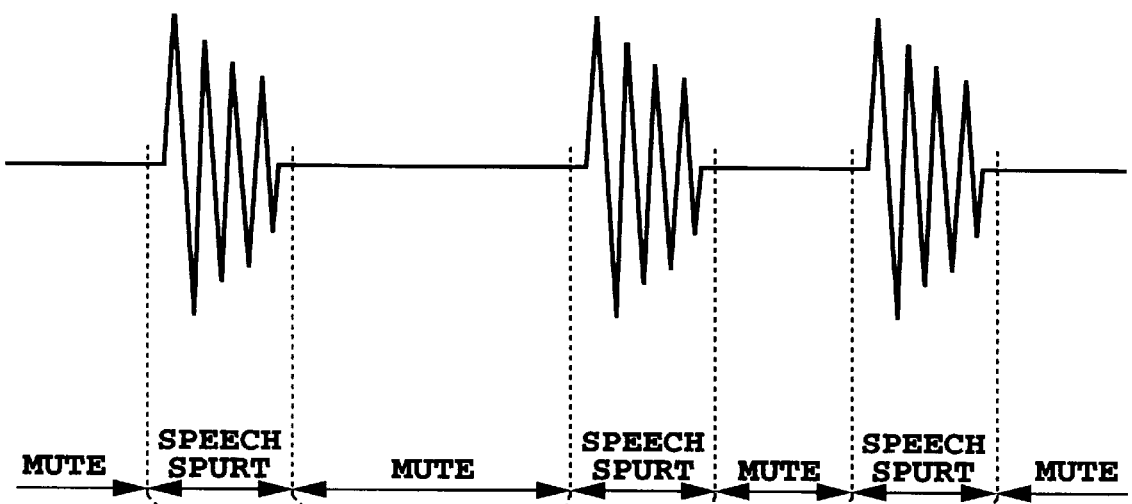
FIG. 4 is a schematic diagram illustrating compression of silent sections with the message compressor.
Figure 4:
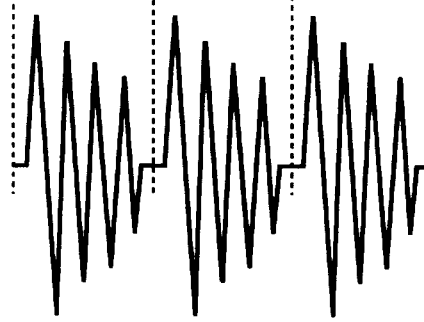

FIG. 3 is a block diagram showing an arrangement of the message compressor 34. A voice message read from the common storage 33 is fed to a speech spurt detector 41. The speech spurt detector 41 provides the detection results to a mute compressor 42. The mute compressor 42 compresses the silence sections of the message, and outputs a stream of only the speech spurt sections of the message. FIG. 4 illustrates this operation, wherein FIG. 4(A) illustrates the waveform of an original message before compression, and FIG. 4(B) illustrate that of a compressed message.

Figure 5:
FIG. 5 is a schematic diagram illustrating compression of a repeated pattern with the message compressor.
Figure 5:
Figure 5:
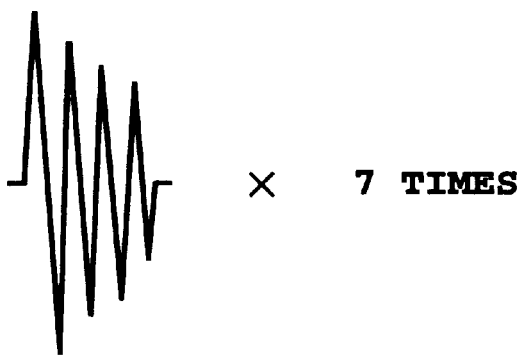

The output of the mute compressor 42 is supplied to a repeated pattern detector 43. The repeated pattern detector 43 detects repetition of the message waveform, and supplies the detection result (the number of repeated patterns) to a repeated pattern compressor 44. The repeated pattern compressor 44 compresses the message waveform in accordance with the number of repetition. FIG. 5 illustrate this: FIG. 5(A) illustrates the waveform of the message before compression; and FIG. 5(B) illustrates that of the compressed message. As shown in FIG. 5(B), the waveform and the repetition number are recorded in terms of the repeated pattern.

Figure 6:
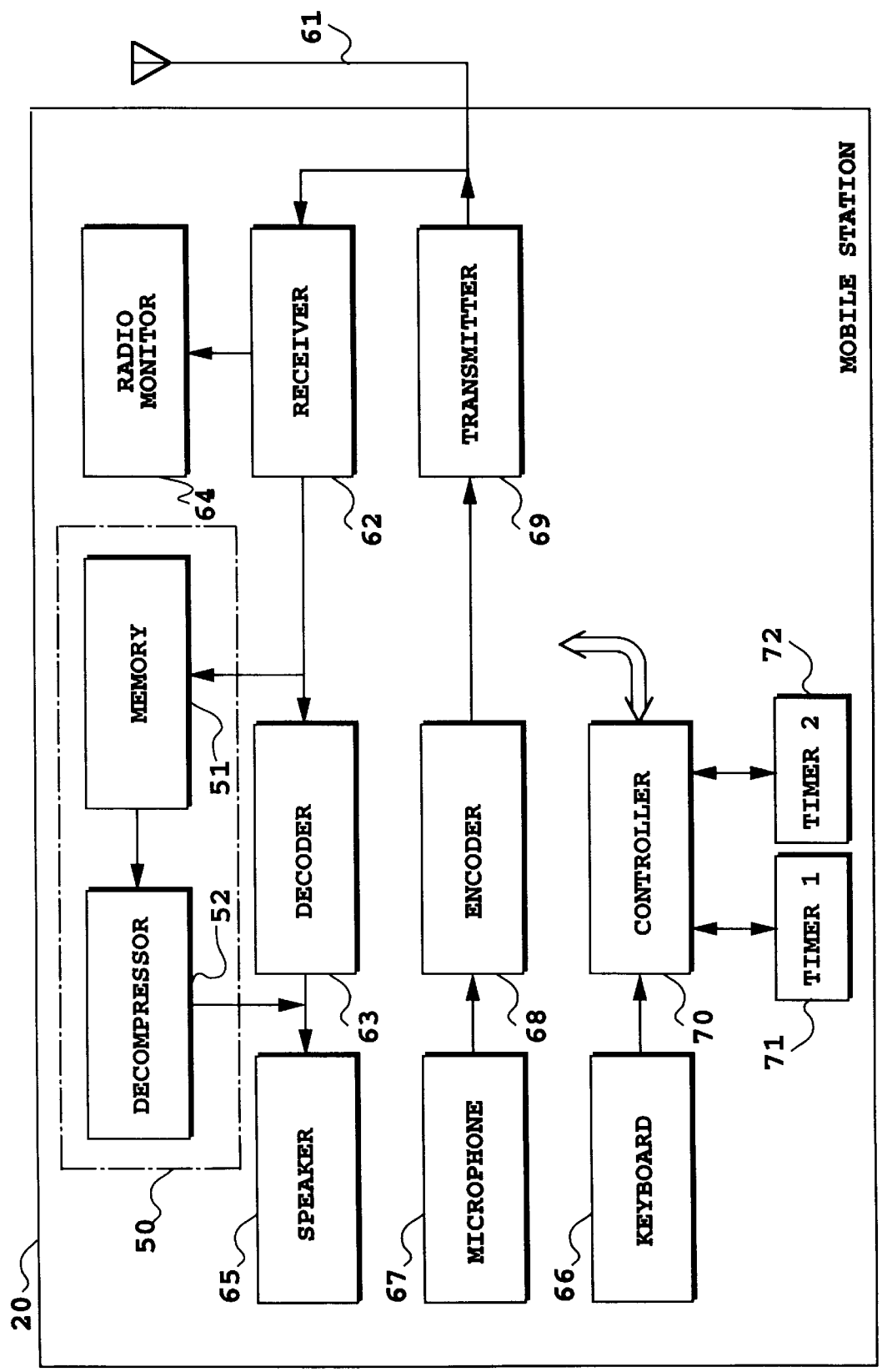
FIG. 6 is a block diagram showing an arrangement of a mobile station of the embodiment.

FIG. 6 is a block diagram showing a configuration of the mobile station. A received signal fed from an antenna 61 is supplied to a receiver 62 to be detected and amplified. The output of the receiver 62 falls into two classes in accordance with receiving modes. In a common receiving mode, a common message without compression is output, whereas in an answering receiving mode, a compressed message is output. The common message is supplied to a decoder 63, whereas the compressed message is supplied to a memory 51 in an answering machine 50. Furthermore, a radio monitor 64 is connected the receiver 62, and the output of the receiver 62 is fed to the radio monitor 64.

The radio monitor 64 regularly monitors the radio wave in order to check whether the mobile station 20 can communicate with the communications network 10. In other words, the radio monitor 64 regularly monitors whether the mobile station 20 is within service area or out of service area, and informs a controller 70 of the result.

The common message decoded by the decoder 63 is fed to a speaker 65, and is output in the form of voice. On the other hand, the compressed message stored in the memory 51 of the answering machine 50 is transformed into a common message by decompression with a decompressor 52, and is fed to the speaker 65 to be reproduced. This decompression and reproduction is activated by the controller 70 in response to the command input from a keyboard 66.

On the other hand, the voice input from a microphone 67 is encoded by an encoder 68, and is transmitted from the antenna 61 via a transmitter 69. Furthermore, commands to the communications network 10, which are input from the keyboard 66, are fed to the transmitter 69 from the controller 70, and is transmitted from the antenna 61.

The controller 70 is connected to various portions to control them. The controller 70 is also connected to timers 71 and 72. The timers 71 and 72 continue their operation after the power of the mobile station 20 is turned off, and inform the controller 70 when predetermined times have elapsed. The timer 71 is provided to prevent an inquiry about the presence of a message addressed to the mobile station from being sent again to the communications network 10 in a short time interval. The predetermined time of the timer 71 is set at 5–15 minutes. On the other hand, the timer 72 is used when the user of a mobile station 20 does not respond even if there is a call connection to that mobile station. In this case, the controller 70 of the mobile station 20 inquires of the communications network 10 about the presence of the voice message after waiting for about 3–10 minutes. Thus, the timer 72 is used to set a time interval between the occurrence of a call connection to the answering machine of the mobile station 20 and the transmission of an automatic inquiry to the communications network 10. This time interval is set at an estimated time interval from the start of the message transmission by a source mobile station to the end of storing of the compressed data of the message.

Figure 7:
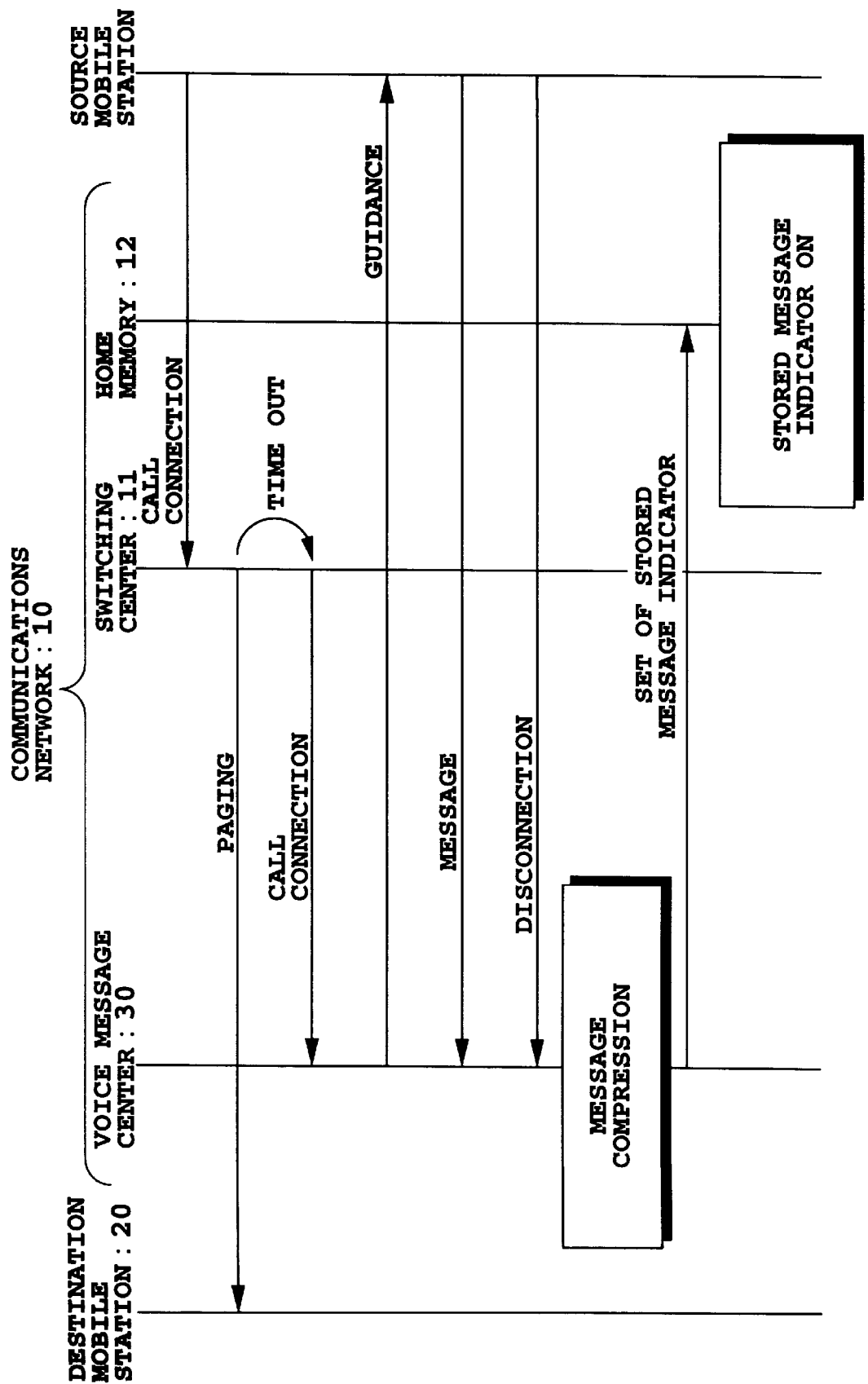
FIG. 7 is a diagram showing a call connection processing in a voice message center in the communications network.

Next, the message storing operation at the voice message center 30 in the communications network 10 will be described with reference to FIG. 7, exemplifying the case where a source mobile station calls a destination mobile station 20 through the communications network 10.

When a call connection takes place from the source mobile station, the switching center 11 of the communications network 10 carries out paging to the destination mobile station 20. When the destination mobile station 20 does not respond for a predetermined interval, the communications network 10 connects the line to the voice message center 30. The switching device 37 of the voice message center 30 connects the line to the guidance generator 32. The guidance generator 32 transmits to the source mobile station voice information notifying that the voice message center 30 has responded the call connection, and prompting the source mobile station to send a message to the voice message center 30.

Next, the switching device 37 connects the line to the common storage 33 so that the message from the source mobile station is stored in the common storage 33. This storing is carried out using the telephone number of the destination mobile station 20 as an index. The date and time of the call connection and the telephone number of the source mobile station are also recorded.

When the source mobile station disconnects the line after completing the message transmission, the controller 36 commands the message compressor 34 to compress the message stored in the common storage 33. The message compressor 34 writes the compressed message to the compressed message storage 35. After the writing, the home memory 12 receives a signal from the controller 36, and turns on its stored message indicator. Thus, the message from the source mobile station is stored in the voice message center 30 after compression, and its presence is indicated by the stored message indicator.

Figure 8:
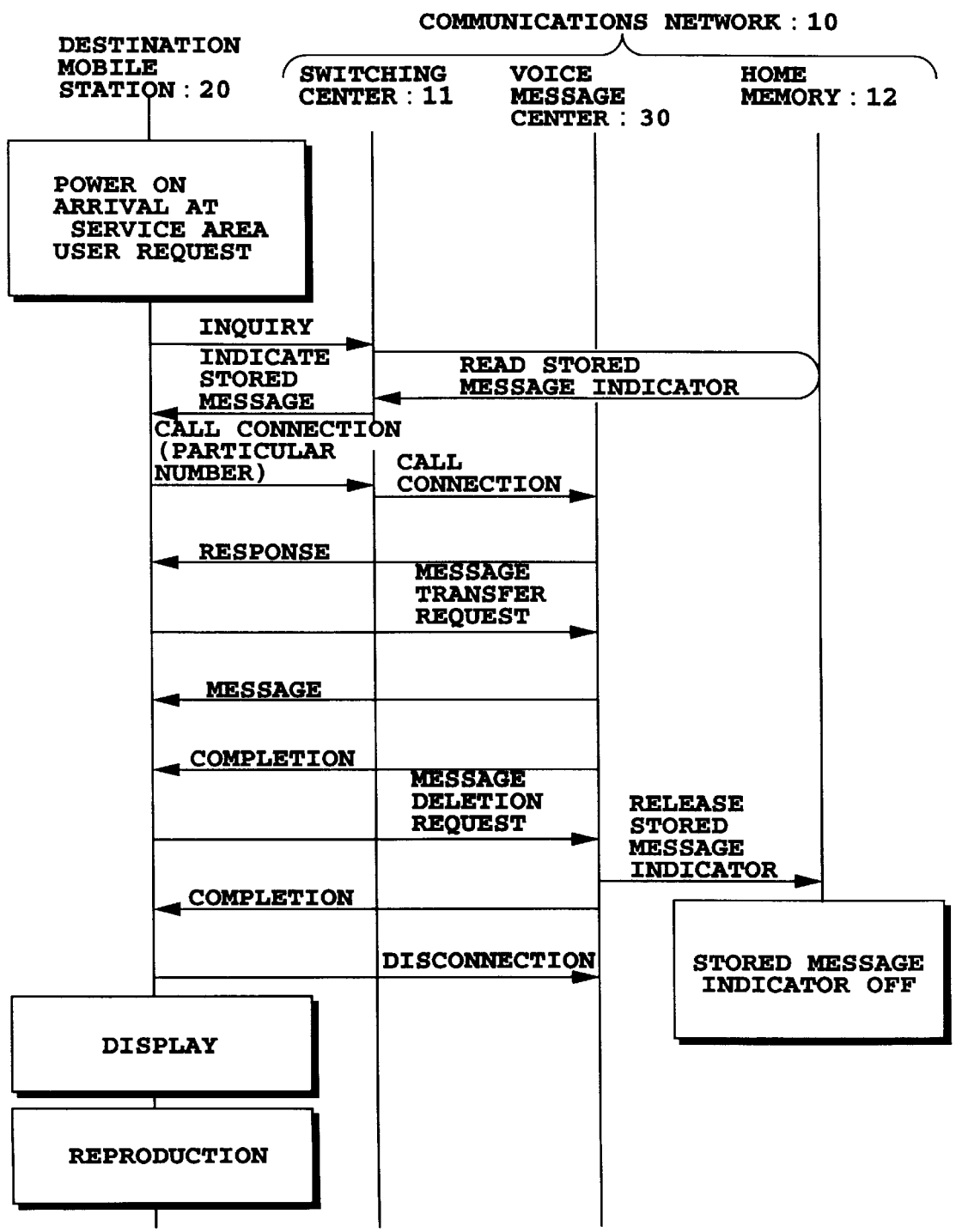
FIG. 8 is a diagram illustrating a processing procedure of a voice message in the embodiment.

FIG. 8 illustrates a message transfer procedure from the communications network 10 to the destination mobile station 20.

The mobile station 20 automatically sends an inquiring message to the communications network 10 when the power is turned on. The inquiring signal is for asking whether a message addressed to the mobile station 20 is stored in the communications network 10 or not, and is automatically sent from the transmitter 69 to the switching center 11 under the control of the controller 70. The inquiring signal is not only sent when the power is turned on, but also when the mobile station 20 arrives at the service area, when a predetermined time has elapsed after the call connection arrived and the user did not respond or after the user issued a command of connection to the voice message center, and when the user issues a request for inquiry. The arrival of the mobile station 20 at the service area is detected by the radio monitor 64 as mentioned before. The request for inquiry of the user is input with the keyboard 66.

The switching center 11, receiving the inquiring signal, accesses the home memory 12 to read out the stored message indicator, and sends the result to the mobile station 20. The mobile station 20 thus obtains information whether or not the message is stored in the voice message center 30 in the communications network 10.

The mobile station 20, informed that the message is stored in the voice message center 30, requests the message transfer. That is, the mobile station 20 automatically transmits a particular number to the communications network 10. The switching center 11 which receives the particular number identifies that the call is a request for connection to the voice message center 30, and connects the line thereto. The switching device 37 of the voice message center 30 connects the line to the guidance generator 32, and sends a response signal. After sending it, the switching device 37 connects the line to the mobile station signal receiver 31, and awaits a signal from the mobile station 20.

The mobile station 20 sends a message transfer request signal when it receives the response signal from the guidance generator 32. The mobile station signal receiver 31, receiving the message transfer request signal, notifies it to the switching device 37. The switching device 37 connects the line to the compressed message storage 35, so that the compressed message is transferred to the mobile station 20. After the completion of the transfer, the switching device 37 connects the line to the guidance generator 32 to send a completion signal. Subsequently, the switching device 37 connects the line to the mobile station signal receiver 31, and awaits a signal from the mobile station 20.

The mobile station 20 stores the received message in the memory 51, and sends a request to delete the message stored in the voice message center 30 when it receives the completion signal. The message deletion request signal is received by the mobile station signal receiver 31, and the deletion request is notified to the controller 36. The controller 36 deletes the message stored in the compressed message storage 35, and provides the home memory 12 with a signal to turn the stored message indicator off. Subsequently, the switching device 37 connects the line to the guidance generator 32 so that a completion signal is sent to the mobile station 20. Then, the mobile station signal receiver 31 is connected to the line to await a signal from the mobile station 20. Upon receiving the completion signal, the mobile station 20 disconnects the line.

The mobile station 20, having stored the message in the memory 51, informs the user of the message reception with a display or beep. The user operates the keyboard 66 to command message reproduction any time when he wishes to hear the message. The controller 70, receiving the command of the message reproduction, supplies the message stored in the memory 51 to the decompressor 52. The decompressor 52 decompresses the message, and supplies it to the speaker 65 to reproduce it. Thus, the message is delivered to the user from the speaker 65.

Since the mobile station 20 reproduces the message stored in the memory 51, the user can adopt a desired operation of reproduction free from the specification of the voice message center 30 of the communications network 10. Accordingly, the user can choose a type of mobile station which adopts a reproduction procedure he desires, which increases the freedom of choice.

Figure 9B:
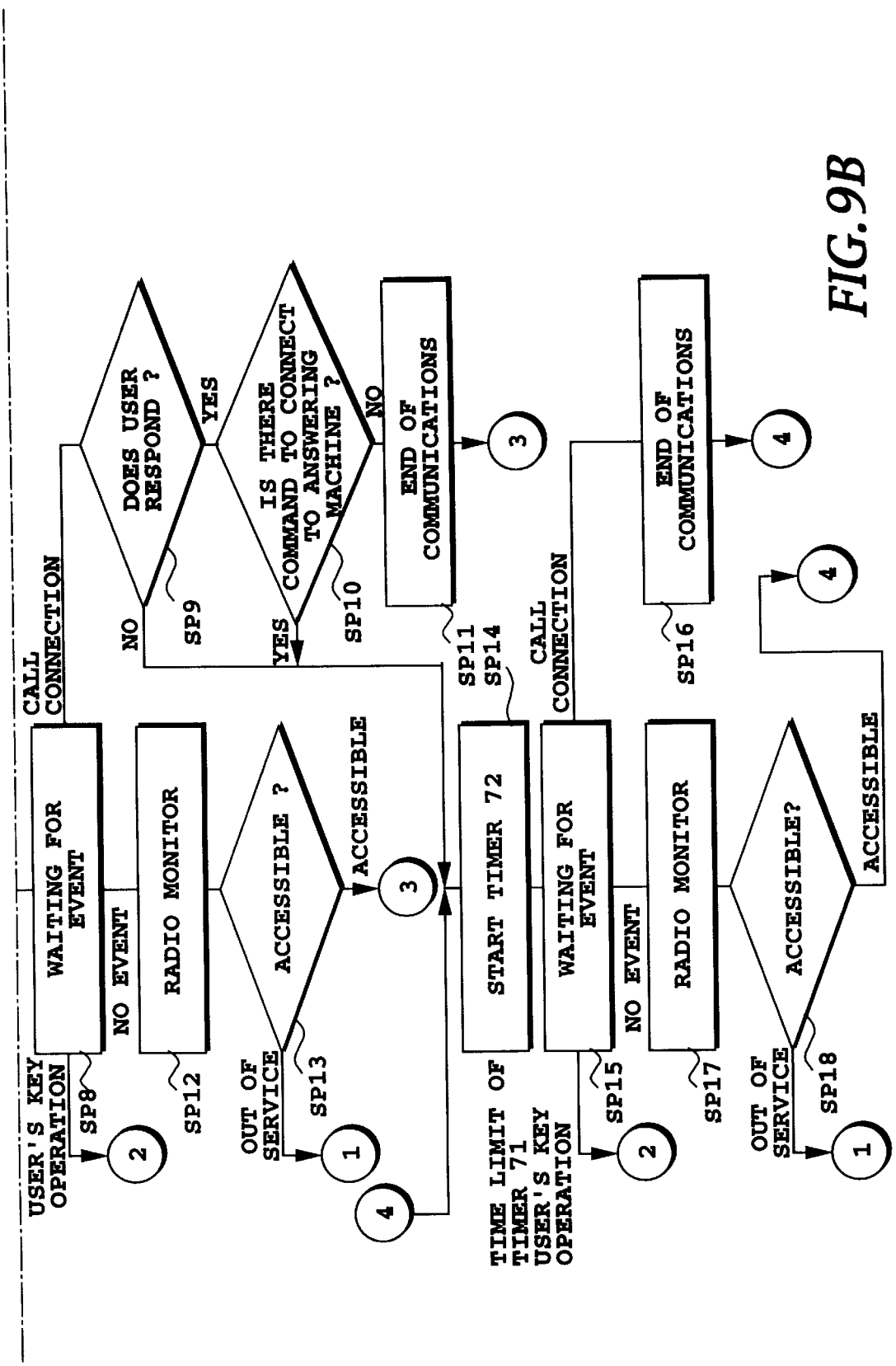

FIGS. 9A and 9B are flowcharts illustrating the operation of the mobile station 20. The mobile station 20 has the following four operation modes:

(1) Arrival decision mode at a service area (steps SP1–SP2).

In this mode, the arrival of the mobile station 20 at a service area is detected. The detection is carried out with the radio monitor 64.

(2) Message transfer mode (steps SP3–SP7)

In this mode, the mobile station 20 inquires the communications network 10 about the presence of a message, and requests its transfer if it is present. This inquiry is not allowed to be carried out twice in a predetermined time interval (5–15 minutes), which is controlled with the timer 71.

(3) Common waiting mode (steps SP8–SP13)

This mode is the common mode of the mobile station 20, in which a call connection from the communications network 10 is detected, a key operation of the user is detected, and the radio monitor is performed. Although there are various key operations, only a mode switching to the message transfer mode is depicted in the flowchart (the key operation at steps SP8 and SP15).

(4) Waiting mode of answering machine (step SP14–SP18)

This mode is activated when a call connection occurs to the answering machine 50 in the mobile station 20. When the mode is activated, the message transfer mode is started after a predetermined time interval has elapsed from the call connection. This time interval corresponds to an estimated time interval from the start of the message transmission by the source mobile station to the storing of the message in the compressed message storage 35, and is set with the timer 72.

Next, the individual modes will be described in more detail.

(1) Arrival decision mode at the service area (steps SP1–SP2)

The radio monitor 64 carries out the radio monitor at step SP1. On the basis of the monitoring result, the controller 70 decides whether the mobile station 20 enters an accessible area to the communications network 10 at step SP2.

(2) Message transfer mode (steps SP3–SP7)

This mode is activated in the following cases: When the arrival of the mobile station 20 at the service area is detected at step SP2; when the user, operating the keyboard 66, requests the execution of the message transfer mode at step SP8 or SP15; and when the time interval set in the timer 72 has elapsed.

When this mode is started, the controller 70 decides whether the timer 71 is in the ON state at step SP3. Once the timer 71 has been turned on, it is not turned off again until a predetermined time interval (5–15 minutes) has elapsed. Thus, when the timer 71 is in the ON state, the controller 70 recognizes that it has not passed a sufficient time since the preceding execution of this mode, and exits this mode to enter the common waiting mode (step SP8). On the other hand, when the timer 71 is in the OFF state, the controller 70 carries out an inquiry of the communications network 10 at step SP5 after turning on the timer 71. The controller 70 checks the response from the communications network 10 at step SP6, and requests the message transfer at step SP7 when the message is present in the voice message center 30. When there is no message in the voice message center 30, the processing is moved to the common waiting mode.

(3) Common waiting mode (steps SP8–SP13)

At step SP8, the controller 70 awaits an event. When a message transfer request from the user via the keyboard 66 is detected, the controller 70 moves the processing to step SP3.

On the other hand, when a call connection is detected, the controller 70 moves the processing to step SP9, and carries out a call connection processing. Specifically, when the controller 70 detects that the user responds to the call connection at step SP9, it decides whether the response is a connection command to the voice message center 30, in which case, the controller 70 moves the processing to step SP14, and starts the step. Otherwise, the controller 70 awaits at step SP11 the completion of the communications, and moves the processing to step SP8 again to enter the common waiting mode.

When no event is detected at step SP8, the controller 70 commands the radio monitor 64 at step SP12, and decides whether the communications network 10 is accessible or not at step SP13. If it is accessible, the controller 70 returns the processing to step SP8 to continue the common waiting mode. Otherwise, it returns the processing to step SP1, and enters the arrival decision mode at the service area.

(4) Waiting mode of answering machine (steps SP14–SP18)

When the user does not respond to the call connection (step SP9), or the connection to the answering machine is instructed (step SP10), the controller moves the processing to step SP14 and enters this mode.

When this mode is started, the controller 70 starts the timer 72 at step SP14, and awaits an event at step SPi5. The timer 72 is set at a time interval necessary for the incoming message to be stored in the voice message center 30 in the communications network 10. After the time interval set in the timer 72 has elapsed, or when the user designates the transfer mode with the keyboard 66, the controller 70 moves the processing to step SP3 to enter the message transfer mode.

On the other hand, if a new call connection occurs during the time interval set in the timer 72, the controller 70 awaits the completion of the communications at step SP16, and moves the processing to step SP14 again.

When these evens are not detected at step SP15, the radio monitor is carried out at step SP17, and a decision is made whether the communications network 10 is accessible or not at step SP18. If accessible, the controller 70 returns the processing to step SP14, and continues this mode. Otherwise, the controller 70 returns its processing to step SP1, and starts the arrival decision mode at the service area.

According to the present embodiment, since the message is stored once in the common storage 33, a message compression which takes a rather long time can be employed. That is, a compression method of a high efficiency or a sophisticated encryption can be adopted. A high efficiency data compression method makes it possible to reduce the traffic between the communications network 10 and the mobile station 10. In addition, messages of different transmission rate or format can be converted into a desired rate or format, and then stored and transmitted, Furthermore, since the voice message center 30 in the communications network 10 responds to the source mobile station, the operation at the source mobile station can be standardized. Moreover, the message can be reproduced by a request from a mobile station other than the destination mobile station 20.

Although the message is stored in the voice message center 30 in the communications network 10 when the user or the mobile station 20 does not respond, the embodiment is not restricted to this. For example, if the user does not respond even if the mobile station responds, the message can be stored in the memory 51 of the mobile station 20.

In addition, it is possible to set the voice message center 30 of the communications network 10 to respond at all times. This setting can be performed before a call connection, or when a call connection occurs. Alternatively, such setting can be made automatically only for a predetermined time period.

Finally, the present invention is compared with the third prior art. The third prior art discloses (1) that a subscriber reproduces a message in response to a notice from the communications network, and (2) that the communications network performs paging and transmits a message to a mobile station when the mobile station carries out its position registration. The third prior art, however, does not disclose a technique of the present invention, wherein the mobile station takes a positive action such as automatically inquires of the communications network the presence of a message and reads it if it is present.

In this embodiment, the position registration signal of the mobile station can also be used as the inquiring signal. This makes it possible to reduce the number of signals in radio sections.

What is claimed is:

1. A mobile communications system which transfers a message sent from a first mobile station to a second mobile station via a communication network, wherein said communications network comprises:

receiving means for receiving a message from said first mobile station;

storing means for storing said message received;

transfer means for transferring the message stored in said storing means to said second mobile station in response to an inquiry from said second mobile station, and said second mobile station comprises:

means for inquiring of said communications network whether a message is stored or not, said inquiring means comprises:

radio monitoring means for detecting whether said second mobile station enters a service area or not, and automatically sending to said communications network an inquiry about the presence of a message addressed to said second mobile station when it enters the service area; and timer means for allowing said inquiry to be sent after a predetermined time interval from a preceding inquiry after a call connection is provided from said communications network to said second mobile station and its user does not respond to the call connection, and memory means for storing said message sent from said communications network.

2. A mobile communications system which transfers a message sent from a first mobile station to a second mobile station via a communications network, wherein said communications network comprises:

receiving means for receiving a message from said first mobile station;

storing means for storing said message received; and transfer means for transferring the message stored in said storing means to said second mobile station in response to an inquiry from said second mobile station, and said second mobile station comprises:

means for inquiring of said communications network whether a message is stored or not, said inquiring means comprises:

radio monitoring means for detecting whether said second mobile station enters a service area or not, and automatically sending to said communications network an inquiry about the presence of a message addressed to said second mobile station when it enters the service area; and timer means for allowing said inquiry to be sent after a predetermined time has elapsed once a call connection is provided from said communications network to said second mobile station and its user does not respond to the call connection, and memory means for storing said message sent from said communication network.

3. A mobile communications method which transfers a message sent from a first mobile station to a second mobile station via a communications network, wherein processing in said mobile communications network comprises the steps of:

receiving a message from said first mobile station;

storing said message received; and transferring the message stored to said second mobile station in response to an inquiry from said second mobile station, and processing in said second mobile station comprises the steps of:

inquiring of said communications network whether a message is stored or not, said step of inquiring comprises the steps of:

detecting whether said second mobile station enters a service area or not, and automatically sending to said communications network an inquiry about the presence of a message addressed to said second mobile station when it enters the service area; and allowing said inquiry to be sent after a predetermined time interval from a preceding inquiry after a call connection is provided from said communications network to said second mobile station and its user does not respond to the call connection, and storing said message sent from said communications network.

4. A mobile communications method which transfers a message sent from a first mobile station to a second mobile station via a communications network, wherein proceeding in said communications network comprises the steps of:

receiving a message from said first mobile station;

storing said message received; and transferring the message stored to said second mobile station in response to an inquiry from said second mobile station, and processing in said second mobile station comprises the steps of:

inquiring of said communications network whether a message is stored or not, said step of inquiring comprises the steps of:

detecting whether said second mobile station enters a service area or not, and automatically sending to said communications network an inquiry about the presence of a message addressed to said second mobile station when it enters the service area; and sending said inquiry after a predetermined time has elapsed once a call connection is provided from said communications network to said second mobile station and its user does not respond to the call connection, and storing said message sent from said communications network.

5. A communications network which transfers a message transmitted from a first mobile station to a second mobile station, said communications network comprising:

responding means for responding to said first mobile station when said second mobile station does not respond;

receiving means for receiving a message from said first mobile station;

first storing means for storing said message received;

compression means for compressing said message stored in said first storing means;

second storing means for storing a compressed message; and transfer means for reading out said compressed message stored in said second storing means, and for transferring it to said second mobile station in response to an inquiry from second mobile station, said inquiry being sent when said second mobile station enters a service area and being sent after a predetermined time has elapsed once a call connection is provided from said communications network to said second mobile station and its user does not respond to the call connection.

6. A mobile station connected to a communications network which stores a received message after compression, said mobile station comprising:

means for deciding whether said mobile station is connectable to said communications network;

inquiring means for inquiring, when connectable, of said communications network about the presence of a compressed message which has been stored, said inquiring means comprises:
    radio monitoring means for detecting whether said second mobile station enters a service area or not, and automatically sending to said communications network an inquiry about the presence of a message addressed to said second mobile station when it enters the service area; and
    timer means for allowing said inquiry to be sent after a predetermined time has elapsed once a call connection is provided from said communications network to said second mobile station and its user does not respond to the call connection, and
    receiving means for receiving said compressed message transmitted from said communications network;
    memory means for storing said compressed message received by said receiving means;
    decompression means for decompressing said compressed message stored in said memory means; and
    means for reproducing a decompressed message.

7. A communications network which transfers a message transmitted from a first mobile station to a second mobile station, said communications network comprising;
    responding means for responding to said first mobile station when said second mobile station does not respond;
    receiving means for receiving a message from said first mobile station;
    first storing means for storing said message received;
    compression means for compressing said message stored in said first storing means;
    second storing means for storing a compressed message; and
    transfer means for reading out said compressed message stored in said second storing means, and for transferring it to said second mobile station in response to an inquiry from second mobile station, said inquiry being sent when said second mobile station enters a service area and after a predetermined time interval from a preceding inquiry after a call connection is provided from said communications network to said second mobile station and its user does not respond to the call connection.

8. A mobile station connected to a communications network which stores a received message after compression, said mobile station comprising:
    means for deciding whether said mobile station is connectable to said communications network;
    inquiring means for inquiring, when connectable, of said communications network about the presence of a compressed message which has been stored, said inquiring means comprises;
    radio monitoring means for detecting whether said second mobile station enters a service area or not, and automatically sending to said communications network an inquiry about the presence of a message addressed to said second mobile station when it enters the service area; and
    timer means for allowing said inquiry to be sent after a predetermined time interval from a preceding inquiry after a call connection is provided from said communications network to said second mobile station and its user does not respond to the call connection, and
    receiving means for receiving said compressed message transmitted from said communications network;
    memory means for storing said compressed message received by said receiving means;
    decompression means for decompressing said compressed message stored in said memory means; and
    means for reproducing a decompressed message.

9. A method for transferring a message sent from a first mobile station to a second mobile station via a mobile communications network, comprising the steps of:
    receiving a message in said communication network from said first mobile station;
    storing in said communication network said message received; and
    transferring the message stored to said second mobile station in response to an inquiry from said second mobile station, said inquiry being as to whether a message is stored or not, said inquiry including the steps of:
        detecting whether said second mobile station enters a service area or not, and automatically sending to said communications network an inquiry about the presence of a message addressed to said second mobile station when it enters the service area; and
    sending said inquiry after a predetermined time has elapsed once a call connection is provided from said communications network to said second mobile station and its user does not respond to the call connection, and storing in the second mobile station said message sent from said communications network.

* * * * *